United States Patent
Zhang et al.

(10) Patent No.: US 10,437,706 B2
(45) Date of Patent: Oct. 8, 2019

(54) DEBUGGING SYSTEM AND METHOD FOR EMBEDDED DEVICE

(71) Applicant: Primax Electronics Ltd., Taipei (TW)

(72) Inventors: Shi-Jie Zhang, Taipei (TW); Che-Yen Huang, Taipei (TW); Chen-Ming Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 150 days.

(21) Appl. No.: 15/683,096

(22) Filed: Aug. 22, 2017

(65) Prior Publication Data
US 2018/0267881 A1 Sep. 20, 2018

(30) Foreign Application Priority Data
Mar. 17, 2017 (TW) .............................. 106108938 A

(51) Int. Cl.
*G06F 11/00* (2006.01)
*G06F 11/36* (2006.01)
*G06F 21/60* (2013.01)

(52) U.S. Cl.
CPC .......... *G06F 11/366* (2013.01); *G06F 11/362* (2013.01); *G06F 21/602* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,715,387 | A | * | 2/1998 | Barnstijn | G06F 11/3664 714/38.12 |
| 5,815,653 | A | * | 9/1998 | You | G06F 11/3664 714/25 |
| 6,311,326 | B1 | * | 10/2001 | Shagam | G06F 11/3636 714/E11.21 |
| 7,318,172 | B2 | * | 1/2008 | Lou | G01R 31/31705 714/25 |
| 8,336,029 | B1 | * | 12/2012 | McFadden | G06F 9/45516 717/100 |
| 8,782,412 | B2 | * | 7/2014 | Charles | H04L 9/0822 713/168 |

(Continued)

FOREIGN PATENT DOCUMENTS

TW I348615 B 9/2011
TW I546660 B 8/2016

*Primary Examiner* — Amine Riad
(74) *Attorney, Agent, or Firm* — Muncy, Geissler, Olds & Lowe, PC

(57) ABSTRACT

The present invention provides a debugging system and method for an embedded device, including: an embedded device, including a processing unit and a memory unit, where the memory unit includes a staging area used to store debugging data; a mobile storage device, including a debugging data control unit and a storage unit; and a computer, electrically connected to the embedded device and the mobile storage device. The debugging data control unit transmits a debugging demand message to the embedded device by using the computer. The embedded device transmits the debugging data in the staging area back to the computer. The computer transmits the debugging data to the mobile storage device and stores the debugging data in the storage unit.

10 Claims, 2 Drawing Sheets

(56) References Cited

U.S. PATENT DOCUMENTS

| | | | | |
|---|---|---|---|---|
| 8,843,785 B2* | 9/2014 | Haverkamp | ............ | G06F 21/74 |
| | | | | 714/30 |
| 9,477,579 B2* | 10/2016 | Cecka | ................ | G06F 11/3656 |
| 2002/0001989 A1* | 1/2002 | Friesen | .............. | H01R 13/6215 |
| | | | | 439/362 |
| 2003/0014643 A1* | 1/2003 | Asami | .................... | G06F 21/75 |
| | | | | 713/182 |
| 2005/0193220 A1* | 9/2005 | Little | ................. | G06F 11/3656 |
| | | | | 726/5 |
| 2007/0168746 A1* | 7/2007 | Righi | ................. | G06F 11/3656 |
| | | | | 714/38.11 |
| 2008/0295077 A1* | 11/2008 | Sengupta | ............ | G06F 11/0748 |
| | | | | 717/124 |
| 2013/0212653 A1* | 8/2013 | Hoghaug | ................ | G06F 21/34 |
| | | | | 726/5 |
| 2013/0282951 A1* | 10/2013 | Kuo | ..................... | G06F 21/575 |
| | | | | 711/102 |
| 2013/0344885 A1* | 12/2013 | Parisi | ................... | H04W 4/029 |
| | | | | 455/456.1 |

* cited by examiner

DEBUGGING SYSTEM AND METHOD FOR EMBEDDED DEVICE

FIELD OF THE INVENTION

The present invention relates to the application field of an embedded device, and in particular, to a debugging system and method for an embedded device.

BACKGROUND OF THE INVENTION

An embedded system is a computer system that is embedded into a mechanical device or an electrical device and that has a particular function. Different from a personal computer that can process different operation requirements by using various different programs installed thereon, the embedded system can process and control only a single particular function, so as to improve reliability and running efficiency of the particular function.

Nowadays, a large quantity of embedded systems or devices have been applied to telecommunications systems, consumer electronic products, smart household appliances or systems, traffic and transport systems, medical devices and systems, and the like. A general personal computer may perform a self-test program when starting up, to test whether hardware elements in the personal computer can normally run. If hardware is faulty, particular codes may be output according to different test points and displayed in a display device, and a maintenance person can learn a cause of the fault from the displayed codes and perform subsequent maintenance work. However, an embedded device is different from a general personal computer and usually does not have elements such as a keyboard, a screen, or hardware. Therefore, a maintenance person needs to upload debugging data in the embedded device to a computer by using a special debugging device to perform debugging work. In earlier days, for example, a Taiwan Patent Publication No. TWI348615 provides a debugging device. The debugging device can read, by using an interface compatible with the embedded device, debugging information stored in a memory of an embedded device. Recently, for example, a Taiwan Patent Publication No. TWI546660 provides a debugging system. A computer in the debugging system reads debugging information in a memory unit of an embedded device by using an in-circuit emulator. Because there are many types of transmission interfaces for embedded devices, a particular debugging device or in-circuit emulator is applicable only to a particular embedded device. In this way, when maintaining the embedded device, a maintenance person needs to carry a plurality of different debugging devices or in-circuit emulators to read debugging data in the embedded device. Consequently, inconvenience in maintenance may be caused. In addition, a user of a general embedded device is not familiar with the manner of using a debugging device or an in-circuit emulator. Therefore, the user cannot perform detection by himself. When the embedded device is faulty, the entire embedded device usually needs to be sent for repair or examined and repaired by a maintenance person who provides a door-to-door service. Consequently, not only time is wasted, but also inconvenience is caused to the user.

Therefore, how to simplify a detection program of an embedded device to enable a general user to easily perform detection is a technical problem to be resolved by the present invention.

SUMMARY OF THE INVENTION

The main objective of the present invention is to provide a simplified detection program for an embedded device, to enable a general user to perform detection on an embedded device by easily using a debugging device.

To achieve the foregoing objective, the present invention provides a debugging system for an embedded device, including:

an embedded device, including a processing unit and a memory unit, where the memory unit includes a staging area used to store debugging data;

a mobile storage device, including a debugging data control unit and a storage unit; and a computer, electrically connected to the embedded device and the mobile storage device, where the debugging data control unit transmits a debugging demand message to the embedded device by using the computer, the embedded device transmits the debugging data in the staging area back to the computer, and the computer transmits the debugging data to the mobile storage device and stores the debugging data in the storage unit.

In the foregoing preferred implementation, the mobile storage device is electrically connected to the computer by using a first transmission interface, and the first transmission interface is a universal serial bus (USB) interface.

In the foregoing preferred implementation, the computer is electrically connected to the embedded device by using a second transmission interface, and the second transmission interface is: an RS-232 interface, a USB interface, or a line printer terminal (LPT) interface.

In the foregoing preferred implementation, the mobile storage device includes an encryption module, configured to perform an encryption step on the mobile storage device.

In the foregoing preferred implementation, the encryption module is configured to perform an encryption step on the debugging data in the storage unit.

In the foregoing preferred implementation, the computer is: a desktop computer, a laptop computer, a tablet computer, or a personal digital assistant.

The present invention further provides a debugging method for an embedded device, applicable to an embedded device, where the debugging method for an embedded device includes the following steps:

(a). determining, by a computer, whether a debugging demand message is received, if the debugging demand message is not received, continuing performing step (a), and if the debugging demand message is received, performing a next step;

(b). transmitting, by the computer, the debugging demand message to the embedded device;

(c). transmitting, by the embedded device, debugging data in a staging area of a memory unit back to the computer;

(d). transmitting, by the computer, the debugging data to the mobile storage device; and (e). performing, by the mobile storage device, an encryption step.

In the foregoing preferred implementation, in step (d), the mobile storage device stores the debugging data in a storage unit.

In the foregoing preferred implementation, in step (e), the encryption step is used for encrypting the mobile storage device.

In the foregoing preferred implementation, in step (e), the encryption step is used for encrypting the debugging data in the storage unit.

DETAILED DESCRIPTION OF THE PREFERRED EMBODIMENT

Advantages and features of the present invention and a method for implementing same will be described in a more detailed way with reference to exemplary embodiments and accompanying drawings, so as to be more easily understood. However, the present invention may be implemented in different forms and should not be understood as being limited only to the embodiments stated herein. On the contrary, for a person of ordinary skill in the art, these provided embodiments make the present disclosure more thoroughly, comprehensively, and completely convey the scope of the present invention.

Figure 1:
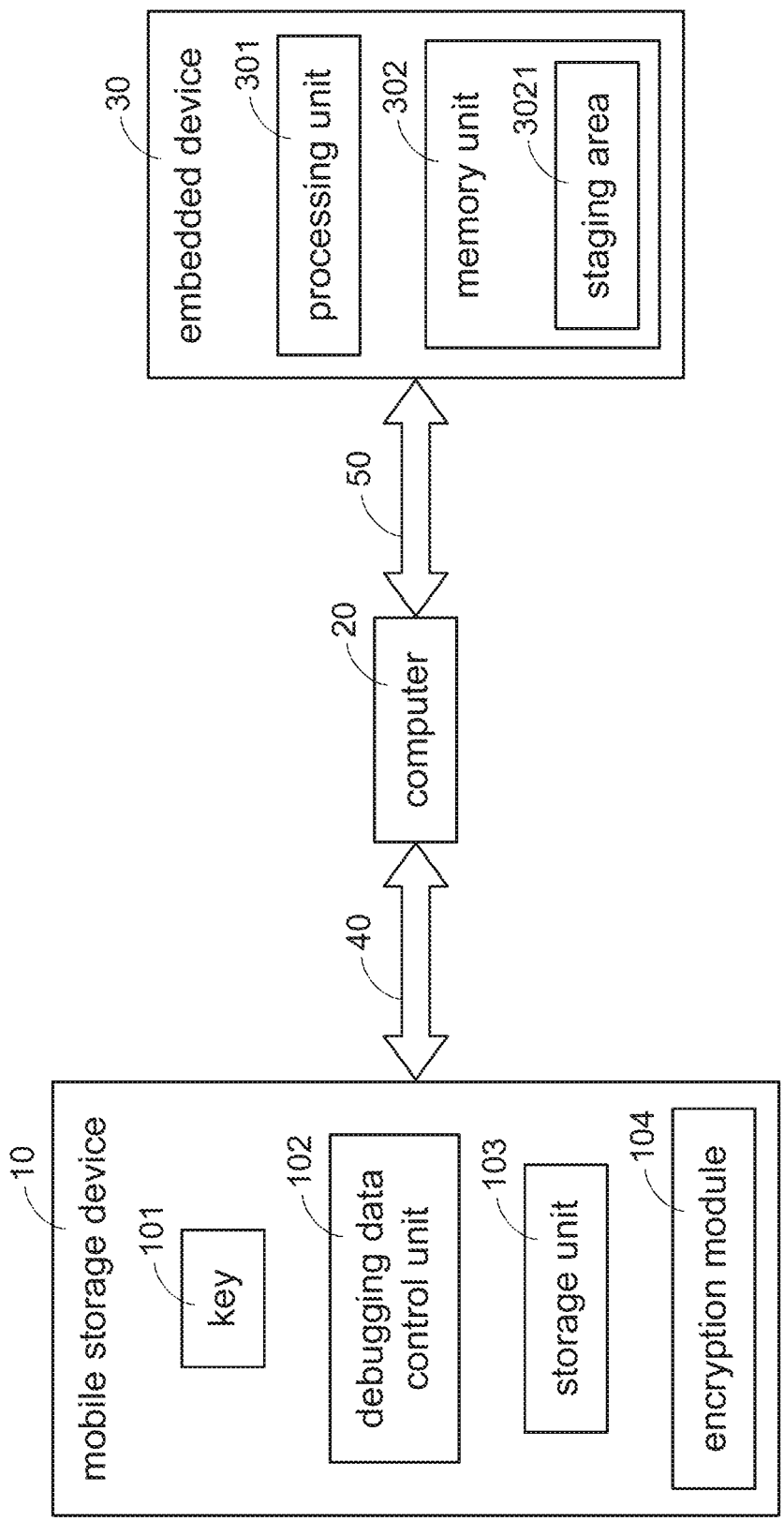
FIG. 1 shows a debugging system for an embedded device according to the present invention.

First, referring to FIG. 1, FIG. 1 shows a debugging system for an embedded device according to the present invention. The debugging system for an embedded device includes: a mobile storage device 10, a computer 20, and an embedded device 30. A key 101, a debugging data control unit 102, a storage unit 103, and an encryption module 104 are disposed in the mobile storage device 10. The key 101 is configured to drive and control the debugging data control unit 102 to transmit a debugging demand message or is configured to input a password needed by the encryption module 104. The computer 20 is electrically connected to the mobile storage device 10 by using a first transmission interface 40 and is electrically connected to the embedded device 30 by using a second transmission interface 50. The computer 20 of the present invention may be: a desktop computer, a laptop computer, a tablet computer, a personal digital assistant, or the like. The first transmission interface 40 is a USB interface. The second transmission interface 50 may be an RS-232 interface, a USB interface, or an LPT interface. The embedded device 30 includes: a processing unit 301 and a memory unit 302. The processing unit 301 is configured to control operation of the embedded device 30 and execute a debugging program (not shown in the figure) and store debugging data obtained by the execution of the debugging program in a staging area 3021 of a memory unit 302.

Referring to FIG. 1 again, in a state in which the mobile storage device 10, the computer 20, and the embedded device 30 are electrically connected, when a user presses down the key 101 of the mobile storage device 10, the debugging data control unit 102 immediately transmits a debugging demand message to the computer 20 by using the first transmission interface 40. The computer 20 then transmits the received debugging demand message to the embedded device 30. After receiving the debugging demand message, the embedded device 30 transmits the debugging data in the staging area 3021 of the memory unit 302 back to the computer 20. The computer 20 transmits the received debugging data to the mobile storage device 10, and the mobile storage device 10 then stores the received debugging data in the storage unit 103. To improve confidentiality of the debugging data, the mobile storage device 10 further performs an encryption step on the mobile storage device 10 by using the encryption module 104. A user may input a password by using the key 101 to perform hardware encryption on the mobile storage device 10, or the encryption module 104 performs, in an RSA algorithm manner, file encryption on the debugging data stored in the storage unit 103. After encryption on the mobile storage device 10 is completed, to reuse the mobile storage device 10, a password needs to be input for decoding, to recover permission, so that the mobile storage device 10 can be accessed or the debugging data stored in the storage unit 103 can be read. The design of encryption can prevent the debugging data of the embedded device 30 from being leaked when the mobile storage device 10 is missing. In addition, a user or a maintenance person may explicitly learn, by using a display device (not shown in the figure) of the computer 20, a transmission state of the debugging data transmitted to the mobile storage device 10 and whether transmission is completed. In this way, the user or the maintenance person may learn whether execution of a detection program is completed. On the other hand, the mobile storage device 10 may drive transmission of the debugging data by means of an operation of the key 101, so that the user or the maintenance person does not need to perform an extra operation program by using the computer 20. In this way, the detection program of the embedded device 30 can be simplified, so as to be conveniently used by the user or the maintenance person.

Figure 2:
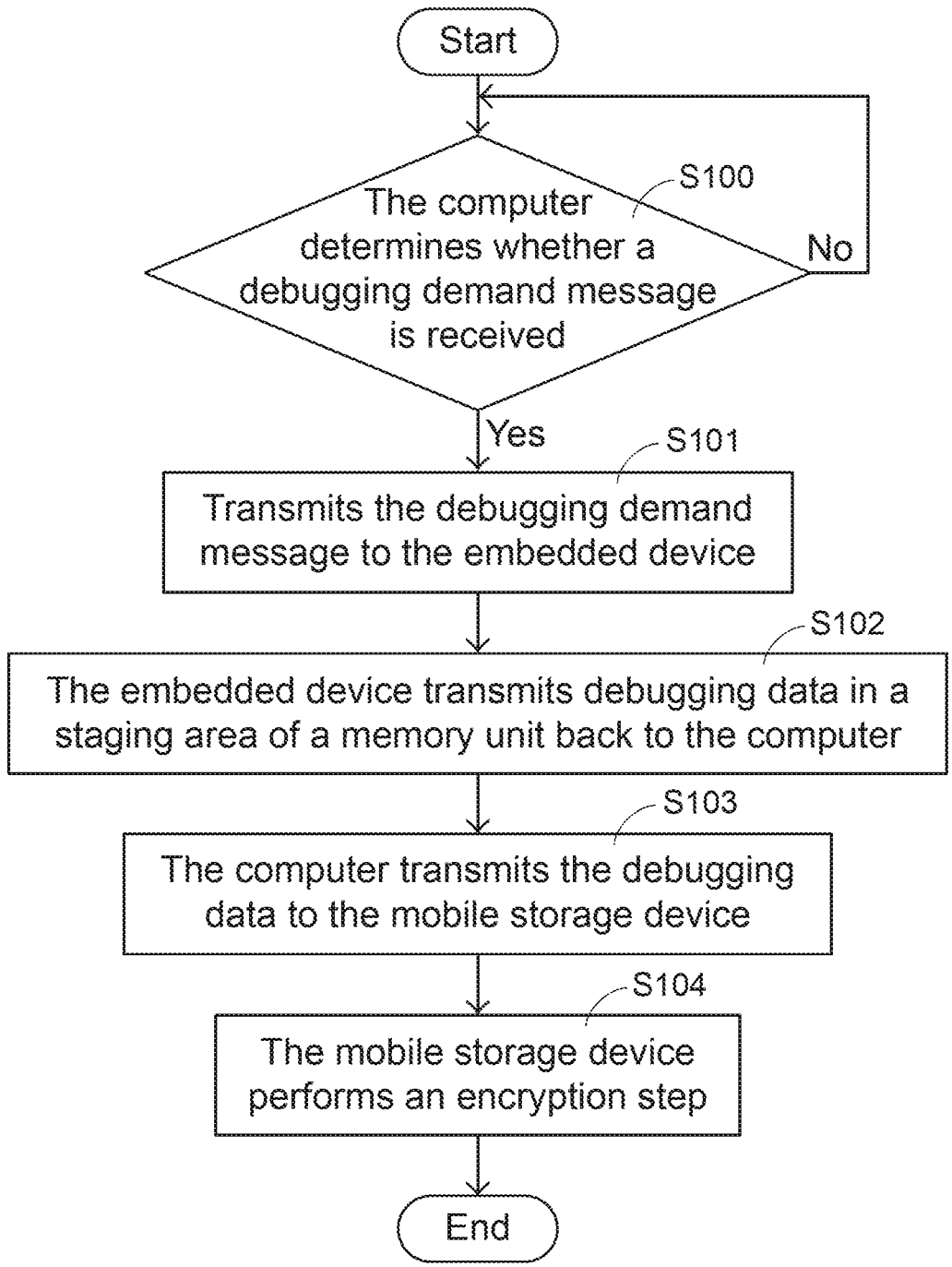
FIG. 2 is a flowchart of a debugging method for an embedded device according to the present invention.

Referring to both FIG. 1 and FIG. 2, FIG. 2 is a flowchart of a debugging method for an embedded device according to the present invention. First, a mobile storage device 10, a computer 20, and an embedded device 30 are electrically connected. Then the computer 20 determines whether a debugging demand message is received (step S100). In step S100, after the mobile storage device 10 is electrically connected to the computer 20, if the debugging demand message is not received, step S100 is continued to detect an execution state. If a user presses down a key 101 on the mobile storage device 10 to drive a debugging data control unit to transmit, by using a first transmission interface 40, the debugging demand message to the computer 20, after receiving the debugging demand message, the computer 20 then transmits the debugging demand message to the embedded device 30 by using a second transmission interface 50 (step S101). After receiving the debugging demand message, the embedded device 30 transmits debugging data in a staging area 3021 of a memory unit 302 back to the computer 20 (step S102). After receiving the debugging data, the computer 20 transmits the debugging data to the mobile storage device 10 (step S103). In step S103, the mobile storage device 10 stores the received debugging data in a storage unit 103. At last, the mobile storage device 10 performs an encryption step (step S104). In step S104, the user may input a password by using the key 101 of the mobile storage device 10 to drive the encryption module 104 to perform hardware encryption on the mobile storage device 10, or after storage of the debugging data is completed, the encryption module 104 may automatically perform hardware encryption on the mobile storage device 10 or perform file encryption on the debugging data stored in the storage unit 103 in an RSA algorithm manner. After the encryption step is completed, if the mobile storage device 10 needs to be reused or accessed, a password needs to be input for decoding, to recover permission, so that the mobile storage device 10 can be used or the debugging data stored in the storage unit 103 can be read. In this way, the design of encryption can also prevent the debugging data of the embedded device 30 from being leaked when the mobile storage device 10 is missing by accident.

Compared with the prior art, in the mobile storage device provided in the present invention, a USB interface common in general consumer electronic products is selected, to save time of searching for a debugging device suitable for an interface for a user or a maintenance person and enable the user or the maintenance person to perform a detection program on an embedded device without purchasing or carrying debugging devices suitable for different interfaces. In addition, transmission and obtaining of debugging data are triggered by using a key, and the operation is very easy and convenient. The user or the maintenance person may explicitly learn, by using a display device of a computer, whether the debugging data has been transmitted to the mobile storage device. In addition, when the user wants to send the mobile storage device back to a maintenance company to analyze the debugging data, by means of the design of encrypting the mobile storage device by using an encryption module, the risk of leakage of the debugging data is also greatly reduced. Therefore, the present invention is actually a creation of great industrial value.

Various modifications can be made to the present invention by a person skilled in the art according to various inventive concepts without departing from the protection scope of the appended claims.

What is claimed is:

1. A debugging system for an embedded device, comprising:
   an embedded device, comprising a processing unit and a memory unit, wherein the memory unit comprises a staging area used to store debugging data;
   a mobile storage device, comprising a key, a debugging data control unit and a storage unit; and
   a computer, electrically connected to the embedded device and the mobile storage device, wherein
   when the key of the mobile storage device is pressed, the debugging data control unit is driven to transmit a debugging demand message to the computer and the computer transmits the debugging demand message to the embedded device to drive the embedded device to transmit the debugging data in the staging area back to the computer, and the computer transmits the debugging data to the mobile storage device and stores the debugging data in the storage unit.

2. The debugging system for an embedded device according to claim 1, wherein the mobile storage device is electrically connected to the computer by using a first transmission interface, and the first transmission interface is a universal serial bus (USB) interface.

3. The debugging system for an embedded device according to claim 1, wherein the computer is electrically connected to the embedded device by using a second transmission interface, and the second transmission interface is: an RS-232 interface, a USB interface, or a line printer terminal (LPT) interface.

4. The debugging system for an embedded device according to claim 1, wherein the mobile storage device comprises an encryption module, configured to perform an encryption step on the mobile storage device.

5. The debugging system for an embedded device according to claim 4, wherein the encryption module is configured to perform an encryption step on the debugging data in the storage unit.

6. The debugging system for an embedded device according to claim 1, wherein the computer is: a desktop computer, a laptop computer, a tablet computer, or a personal digital assistant.

7. A debugging method for an embedded device, applicable to an embedded device, wherein the debugging method for an embedded device comprises the following steps:
   (a). pressing down a key of a mobile storage device to transmit a debugging demand message;
   (b). transmitting, by the computer, the debugging demand message to the embedded device;
   (c). transmitting, by the embedded device, debugging data in a staging area of a memory unit back to the computer;
   (d). transmitting, by the computer, the debugging data to the mobile storage device; and
   (e). performing, by the mobile storage device, an encryption step.

8. The debugging method for an embedded device according to claim 7, wherein in step (d), the mobile storage device stores the debugging data in a storage unit.

9. The debugging method for an embedded device according to claim 7, wherein in step (e), the encryption step is used for encrypting the mobile storage device.

10. The debugging method for an embedded device according to claim 8, wherein in step (e), the encryption step is used for encrypting the debugging data in the storage unit.

\* \* \* \* \*